(12) United States Patent
Sekine et al.

(10) Patent No.: US 10,374,377 B2
(45) Date of Patent: Aug. 6, 2019

(54) LASER MEDIUM, LASER MEDIUM UNIT, AND LASER BEAM AMPLIFICATION DEVICE

(71) Applicant: HAMAMATSU PHOTONICS K.K., Hamamatsu-shi, Shizuoka (JP)

(72) Inventors: Takashi Sekine, Hamamatsu (JP); Yoshinori Kato, Hamamatsu (JP); Yoshinori Tamaoki, Hamamatsu (JP); Takashi Kurita, Hamamatsu (JP); Toshiyuki Kawashima, Hamamatsu (JP); Takaaki Morita, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/544,613

(22) PCT Filed: Jan. 13, 2016

(86) PCT No.: PCT/JP2016/050809
§ 371 (c)(1),
(2) Date: Jul. 19, 2017

(87) PCT Pub. No.: WO2016/117426
PCT Pub. Date: Jul. 28, 2016

(65) Prior Publication Data
US 2018/0278007 A1    Sep. 27, 2018

(30) Foreign Application Priority Data

Jan. 20, 2015 (JP) .................................. 2015-008808

(51) Int. Cl.
*H01S 3/04* (2006.01)
*H01S 3/042* (2006.01)
(Continued)

(52) U.S. Cl.
CPC ............ *H01S 3/042* (2013.01); *H01S 3/025* (2013.01); *H01S 3/0407* (2013.01); *H01S 3/06* (2013.01);
(Continued)

(58) Field of Classification Search
CPC ........ H01S 3/042; H01S 3/025; H01S 3/0407; H01S 3/0604; H01S 3/0608;
(Continued)

(56) References Cited

U.S. PATENT DOCUMENTS 3,611,190 A   10/1971   Keefe, Jr.
3,628,172 A   12/1971   Matovich et al.
(Continued)

FOREIGN PATENT DOCUMENTS

JP   S62-234386 A   10/1987
JP   H02-209778 A   8/1990
JP   2009-49439 A   3/2009

OTHER PUBLICATIONS

International Preliminary Report on Patentability dated Aug. 3, 2017 for PCT/JP2016/050809.

*Primary Examiner* — Armando Rodriguez
(74) *Attorney, Agent, or Firm* — Drinker Biddle & Reath LLP

(57) ABSTRACT

A plate-like laser medium has a through-hole for providing a flow of a cooling medium. The laser medium unit includes the plurality of laser media. A laser beam amplification device includes a laser medium unit 10, an excitation light source 21 that causes excitation light to enter the laser medium unit 10, a through-hole 16a of a window member as a unit for supplying the cooling medium in a through-hole 14a of the laser medium 14, and a cooling medium flow path F1 arranged around the laser medium unit 10.

3 Claims, 13 Drawing Sheets

(51) Int. Cl.
*H01S 3/07* (2006.01)
*H01S 3/10* (2006.01)
*H01S 3/06* (2006.01)
*H01S 3/02* (2006.01)
*H01S 3/093* (2006.01)
*H01S 3/16* (2006.01)
H01S 3/091 (2006.01)

(52) U.S. Cl.
CPC .......... *H01S 3/0604* (2013.01); *H01S 3/0608* (2013.01); *H01S 3/0623* (2013.01); *H01S 3/07* (2013.01); *H01S 3/093* (2013.01); *H01S 3/10* (2013.01); *H01S 3/1611* (2013.01); *H01S 3/1643* (2013.01); *H01S 3/091* (2013.01)

(58) Field of Classification Search
CPC .......... H01S 3/0623; H01S 3/07; H01S 3/093; H01S 3/1611; H01S 3/1643; H01S 3/091; H01S 3/04; H01S 3/06
See application file for complete search history.

(56) References Cited

U.S. PATENT DOCUMENTS

| | | | |
|---|---|---|---|
| 3,715,682 A * | 2/1973 | Young | H01S 3/042 |
| | | | 372/35 |
| 3,766,493 A | 10/1973 | Nicolai et al. | |
| 4,134,084 A | 1/1979 | Dube | |
| 4,845,721 A * | 7/1989 | Hoffmann | H01S 3/025 |
| | | | 372/34 |
| 2007/0002921 A1 | 1/2007 | Perry et al. | |
| 2008/0043790 A1 | 2/2008 | Gruzdev et al. | |

* cited by examiner

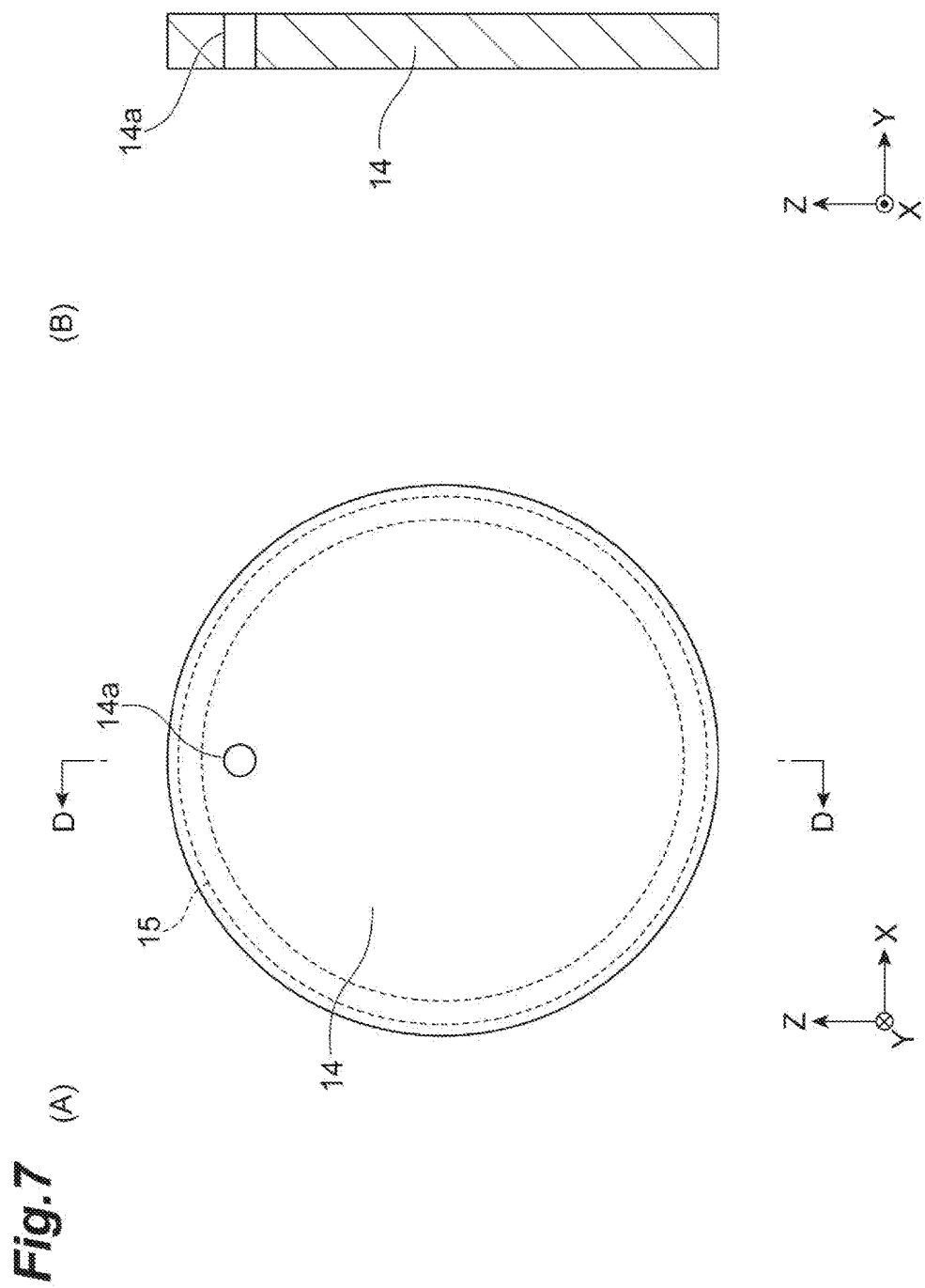

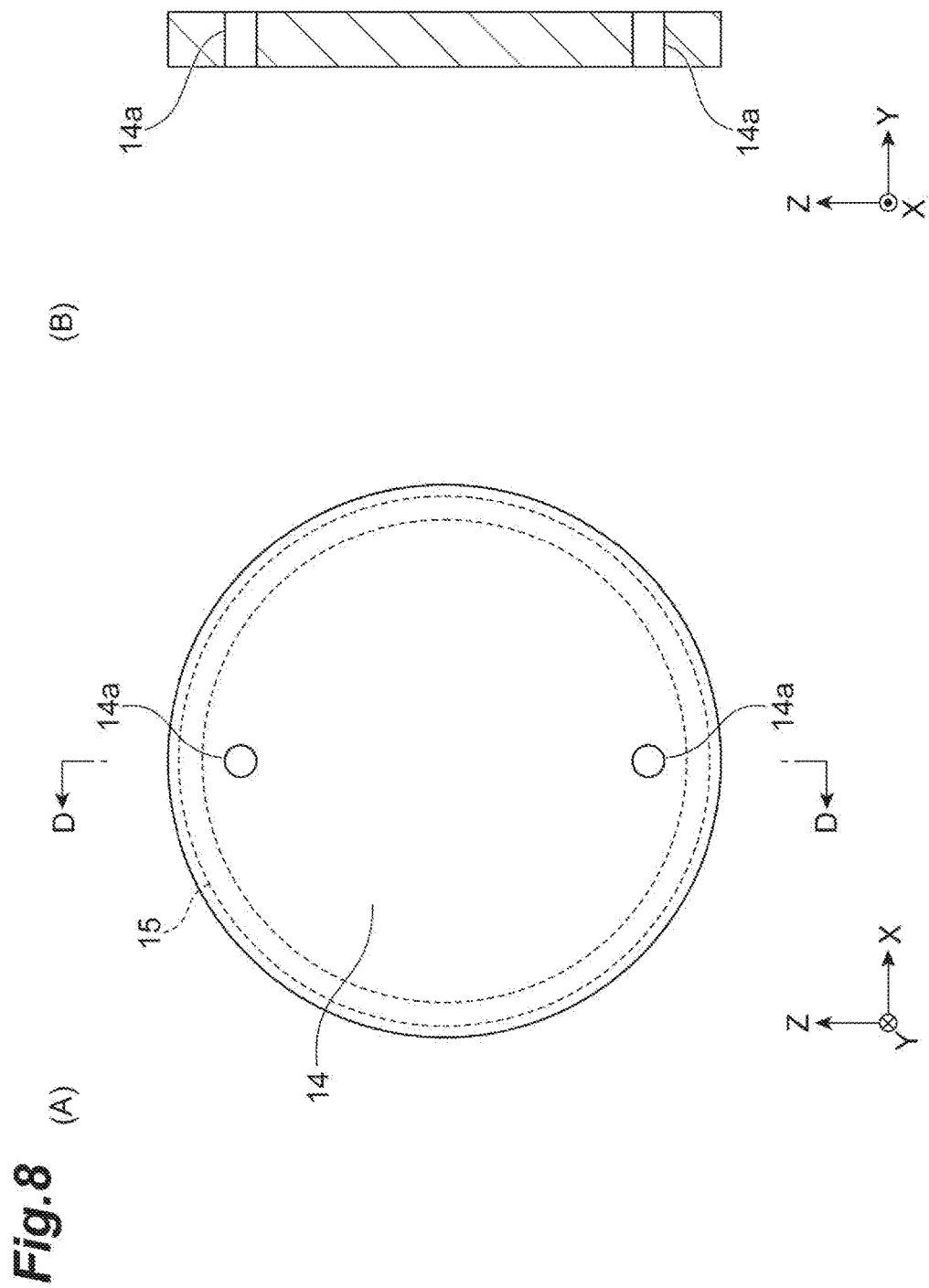

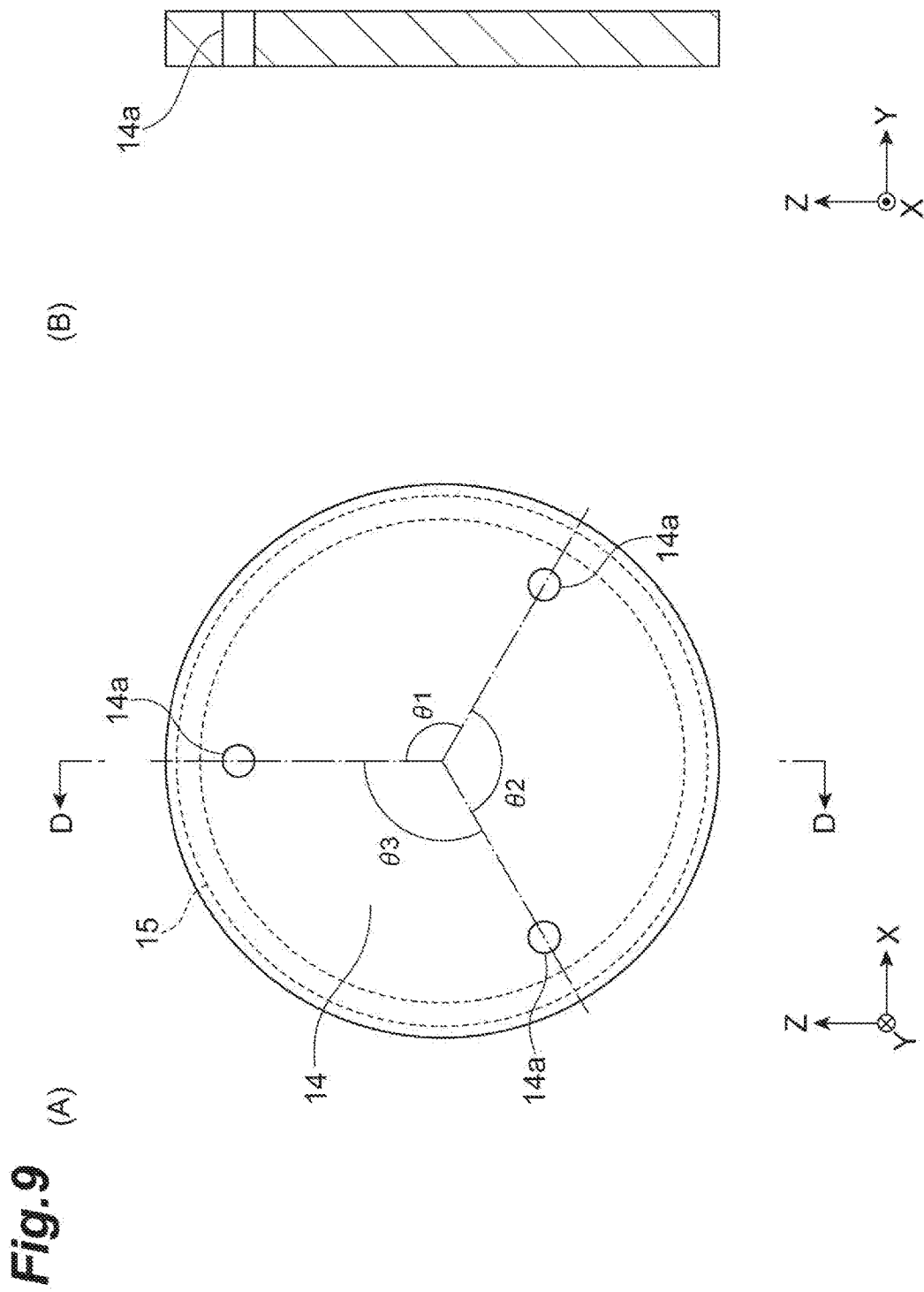

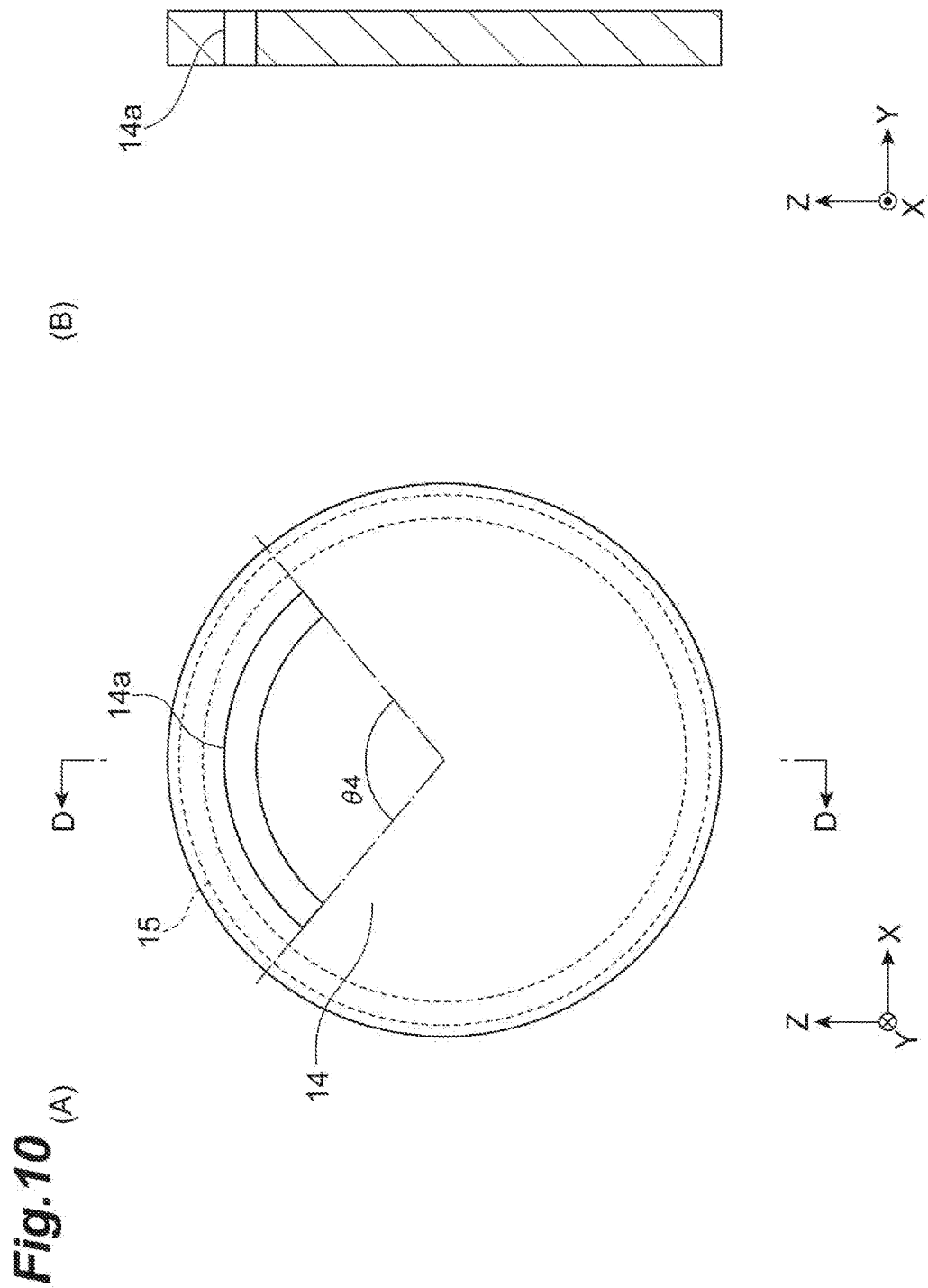

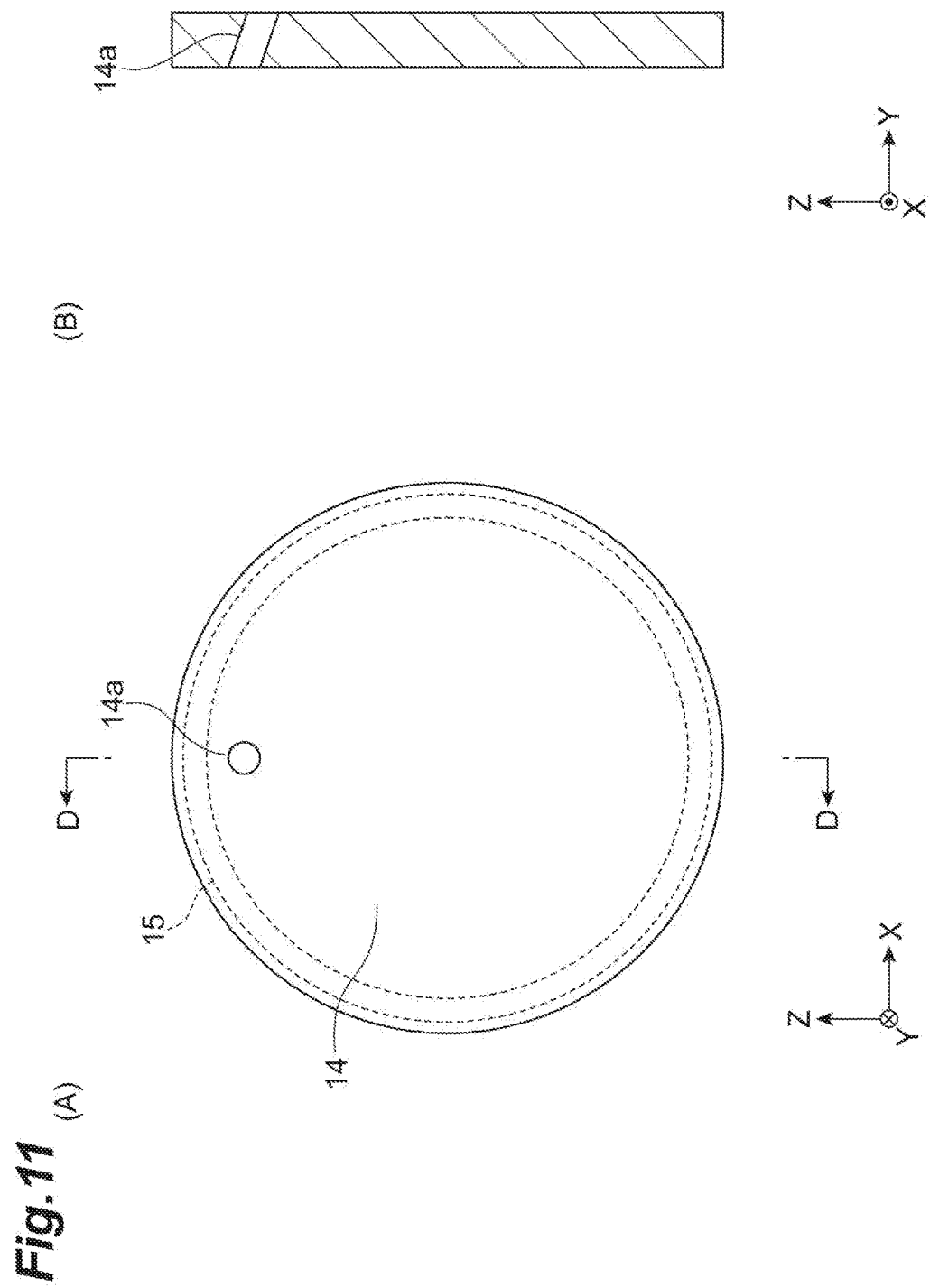

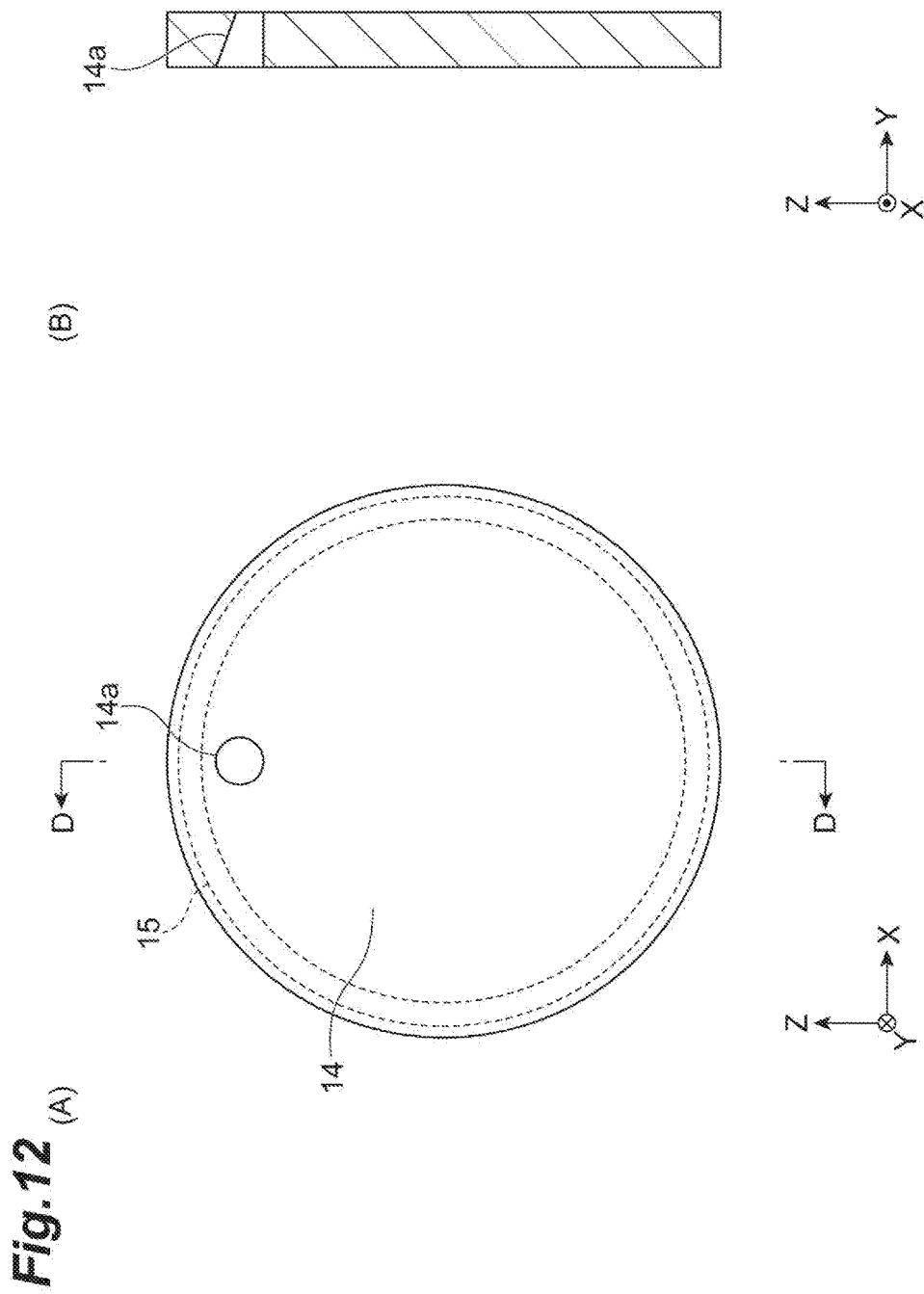

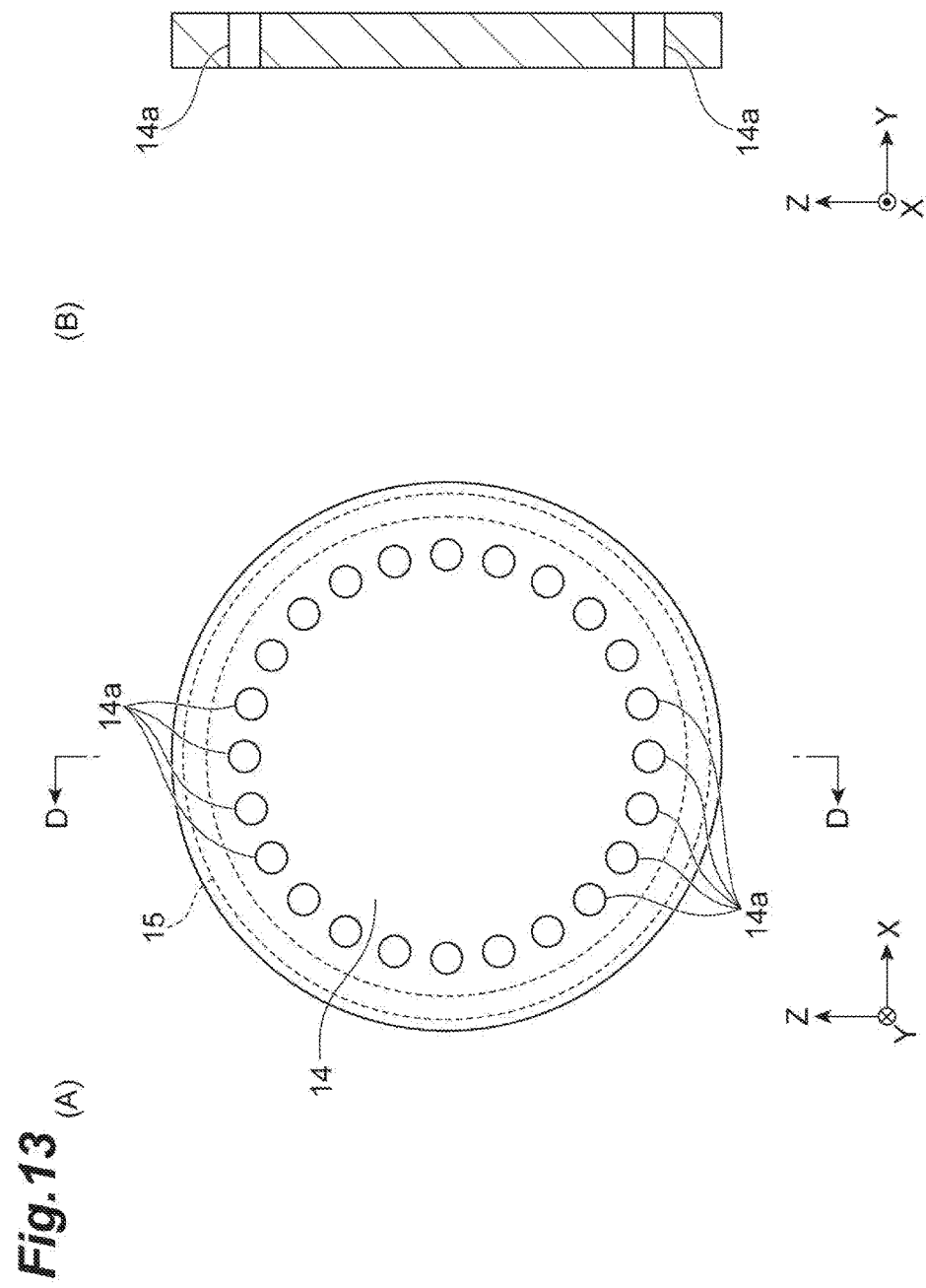

LASER MEDIUM, LASER MEDIUM UNIT, AND LASER BEAM AMPLIFICATION DEVICE

TECHNICAL FIELD

The present invention relates to a laser medium, a laser medium unit, and a laser beam amplification device.

BACKGROUND ART

In recent years, researches and developments such as basic science, material development, and medical application have been actively carried out for new industrial development using a large laser. To obtain a large-output laser beam, a laser beam amplification device for amplifying input seed light is required. The laser beam amplification device includes a laser medium unit and an excitation light source for causing excitation light to enter the laser medium unit. The laser beam amplification device cools a laser medium by flowing a cooling medium to contact with a main surface of the laser medium in the laser medium unit (refer to Patent Literature 1).

CITATION LIST

Patent Literature

Patent Literature 1: Japanese Unexamined Patent Publication No. 2009-49439

SUMMARY OF INVENTION

Technical Problem

However, although it is necessary to cool the laser medium, since the amplified laser beam passes through the cooling medium for flowing on the main surface, the quality of the laser beam such as stability and focusing characteristics is deteriorated due to a flow speed of the cooling medium and the like.

The present invention has been made in consideration of such problems. An object of the present invention is to provide a laser medium which can be used for a laser beam amplification device capable of amplifying a laser beam with high quality, a laser medium unit, and a laser beam amplification device.

Solution to Problem

To solve the above problems, a first laser medium is a plate-like laser medium comprising a through-hole to provide a flow of a cooling medium.

By providing the through-hole in the plate-like laser medium, the flow speed of the cooling medium can be adjusted according to the size of the through-hole to be set. By adjusting the flow speed of the cooling medium, deterioration in stability and focusing characteristics of the laser beam can be prevented.

In particular, a second laser medium includes two or more through-holes. By having two or more through-holes, a flowing direction and the flow speed of the cooling medium can be more accurately adjusted.

In a third laser medium, a shape of an opening of the through-hole is an arc along the outer circumference of the laser medium. In this case, from the viewpoint of the stability of the flow speed and the direction of the cooling medium, there is an effect that a large amount of the cooling medium can be stably flowed at a low speed in one direction.

In a fourth laser medium, the through-hole extends in a direction oblique to the thickness direction of the laser medium. In this case, from the viewpoint of the stability of the flow speed and the direction of the cooling medium, there is an effect that the direction, in which it is desired to flow the cooling medium, has directivity so that the cooling medium can stably flow.

In a fifth laser medium, the through-hole has a tapered shape. In a case where the through-hole has a tapered shape relative to the traveling direction of the cooling medium, from the viewpoint of the stability of the flow speed and the direction of the cooling medium, there is an effect that a cooling performance can be improved by positively generating turbulent flow.

In a sixth laser medium, the through-holes are annularly arranged along the outer circumference of the laser medium. In this case, from the viewpoint of the stability of the flow speed and the direction of the cooling medium, there is an effect that a large amount of the cooling medium can be stably flowed at a low speed in a uniform direction.

In a laser medium unit including one kind of the plurality of laser media described above, the plurality of the laser media is laminated in the thickness direction thereof, and a sealing material is interposed between the adjacent laser media.

Since the sealing material is interposed between the laser media, the cooling medium flows through the through-hole of the laser medium. By laminating the laser media, the laser media can function as a large-sized laser rod. However, since the flow speed of the cooling media can be controlled by the through-holes, the deterioration in the characteristics of the laser beam can be prevented.

In addition, regarding the laser medium unit according to the present invention, in a case where an XYZ three-dimensional orthogonal coordinate system is set and it is assumed that the stacking direction of the laser media be the Y axis, there are adjacent laser media respectively having the through-holes of which positions in an XZ plane are different from each other.

Since the positions of the through-holes, that is, the positions of an introduction port of the cooling medium to the space between the adjacent laser media and an output port are different from each other, the flow path of the cooling medium for flowing between the introduction port and the output port can be controlled.

In addition, from the viewpoint of the stability of the flow speed and the direction of the cooling medium, the positions of the through-holes are set so that the traveling directions of the cooling media respectively flowing in the adjacent spaces are opposite to each other, and distortion of the laser beam caused by the flow of the cooling medium can be offset. For example, in the XZ plane, in a case where it is assumed that the angle of the positive direction of the Z axis be zero degree, the position of the through-hole in the first laser medium is placed at zero degree, and the position of the through-hole in the second laser medium is placed at 180 degrees. In this case, the position of the through-hole in the third laser medium can be placed at zero degree.

In addition, the laser beam amplification device using the laser medium unit includes the laser medium unit, an excitation light source for causing excitation light to enter the laser medium unit, a unit for supplying the cooling medium in the through-hole of the laser medium, and a cooling medium flow path arranged around the laser medium unit.

According to this device, the laser medium is excited by making the excitation light enter the laser medium. When the laser beam enters the laser medium as the seed light, the amplified laser beam is output from the laser medium. In addition, in a case where the plurality of laser media is provided, a multiplication factor also increases.

Here, to minimize the distortion of the laser beam caused by the cooling medium, it is preferable that the flow speed of the cooling medium output from the through-hole and for flowing through the space between the cooling media be small. However, the cooling performance is lowered. Therefore, by providing the cooling medium flow path around the laser medium unit, the laser medium is sufficiently cooled and the characteristics of the laser medium is stabilized while preventing the deterioration in the cooling performance only by the through-hole. Accordingly, the deterioration in the quality of the laser beam such as stability and focusing characteristics can be more prevented, and the laser beam with high quality can be output.

Advantageous Effects of Invention

According to a laser medium and a laser medium unit of the present invention, deterioration in stability and focusing characteristics of a laser beam can be prevented. According to a laser beam amplification device, deterioration in stability and focusing characteristics of a laser beam can be prevented, and the laser beam can be amplified with high quality.

BRIEF DESCRIPTION OF DRAWINGS

FIG. 7-(A) and FIG. 7-(B) are respectively a front view of the laser medium (FIG. 7-(A)) and a sectional view taken along an arrow D-D (FIG. 7-(B)).
FIG. 8-(A) and FIG. 8-(B) are respectively a front view of the laser medium (FIG. 8-(A)) and a sectional view taken along the arrow D-D (FIG. 8-(B)).
FIG. 9-(A) and FIG. 9-(B) are respectively a front view of the laser medium (FIG. 9-(A)) and a sectional view taken along the arrow D-D (FIG. 9-(B)).
FIG. 10-(A) and FIG. 10-(B) are respectively a front view of the laser medium (FIG. 10-(A)) and a sectional view taken along the arrow D-D (FIG. 10-(B)).
FIG. 11-(A) and FIG. 11-(B) are respectively a front view of the laser medium (FIG. 11-(A)) and a sectional view taken along the arrow D-D (FIG. 11-(B)).
FIG. 12-(A) and FIG. 12-(B) are respectively a front view of the laser medium (FIG. 12-(A)) and a sectional view taken along the arrow D-D (FIG. 12-(B)).
FIG. 13-(A) and FIG. 13-(B) are respectively a front view of the laser medium (FIG. 13-(A)) and a sectional view taken along the arrow D-D (FIG. 13-(B)).

DESCRIPTION OF EMBODIMENTS

Figure 1:
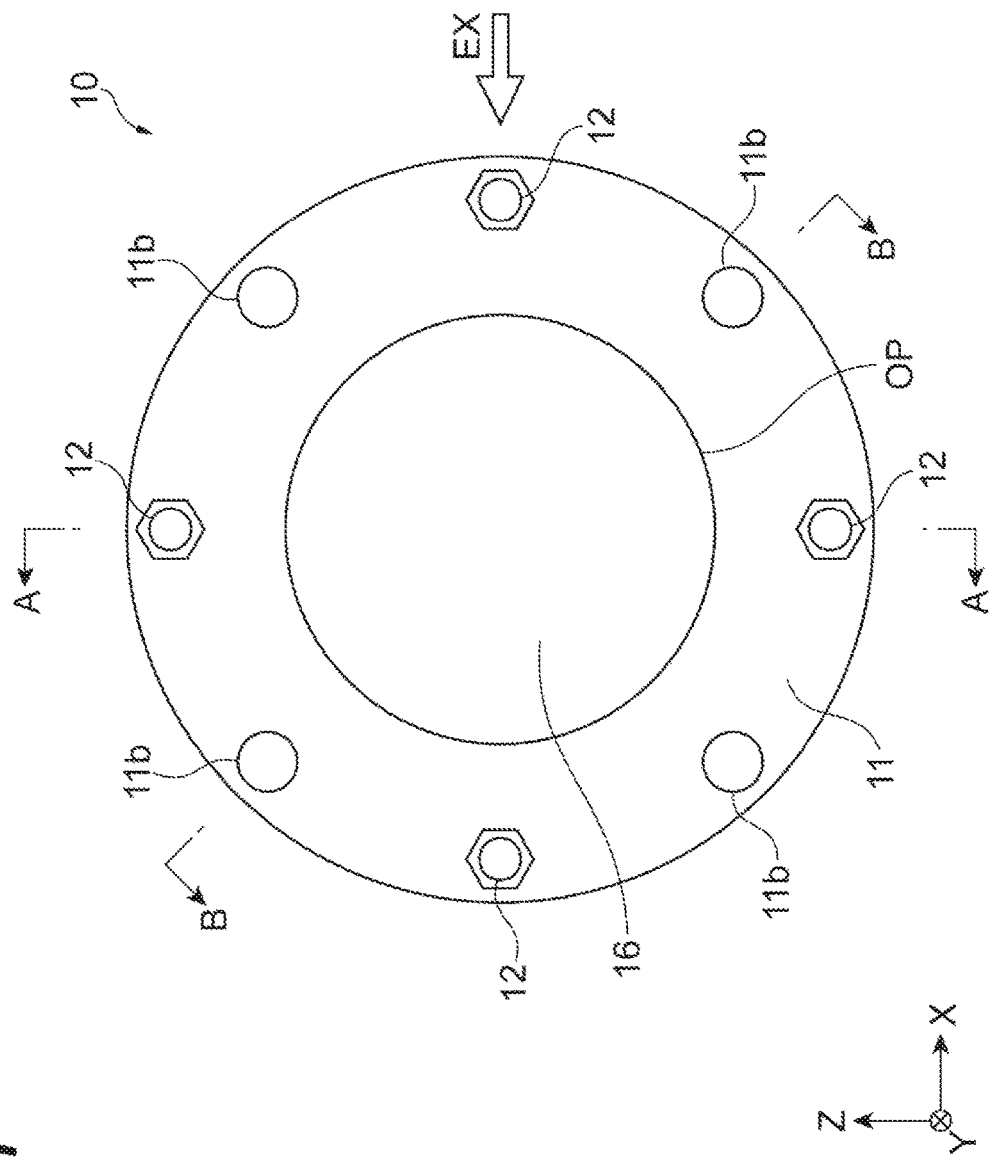
FIG. 1 is a front view of a laser medium unit.

A laser medium, a laser medium unit, and a laser beam amplification device according to the embodiment are described below. The same components are respectively denoted with the same reference numerals, and redundant description is omitted.

FIG. 1 is a front view of the laser medium unit. In FIG. 1, an XYZ three-dimensional orthogonal coordinate system is also illustrated. A traveling direction of a laser beam as seed light to be amplified is the Y-axis direction, and the two directions perpendicular to the Y axis are the X-axis direction and the Z-axis direction.

The laser beam amplification device according to the embodiment includes a laser medium unit 10 where the seed light enters. The laser medium unit 10 is a columnar unit including a plurality of plate-like laser media. The laser medium plates are laminated and aligned along the traveling direction of the seed light (positive direction of Y axis). Excitation light EX is emitted into the laser medium from the outside of the laser medium unit 10. The plurality of excitation light beams EX is emitted from a plurality of light sources toward the central part of each laser medium. When the excitation light EX is emitted, the excitation light enters the laser medium from the outer peripheral surface of the laser medium, and the laser medium is excited. Then, when the excited laser medium is irradiated with the seed light, the laser beam is amplified. For example, in a case where a laser medium composed of ytterbium (Yb)-added YAG is used, wavelengths $\lambda 1$ of the seed light and spontaneous emission light from the laser medium are 1030 nm, and a wavelength $\lambda 2$ of the excitation light is 940 nm ($\lambda 1 > \lambda 2$). The added concentration of Yb in the laser medium can be preferably set to 0.1 atomic % to 10 atomic %.

Figure 2:
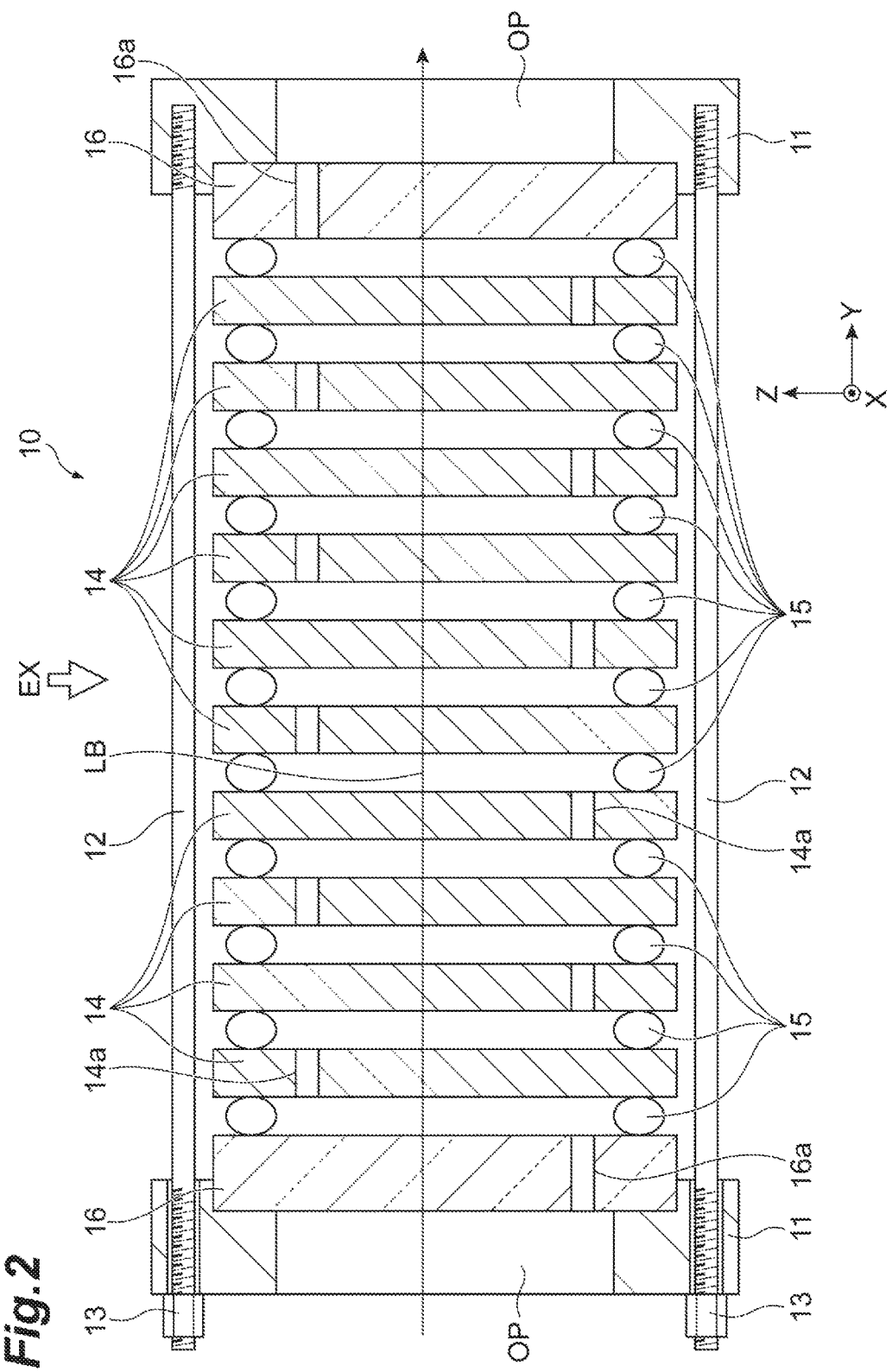
FIG. 2 is a sectional view of the laser medium unit taken along an arrow A-A.
Figure 3:
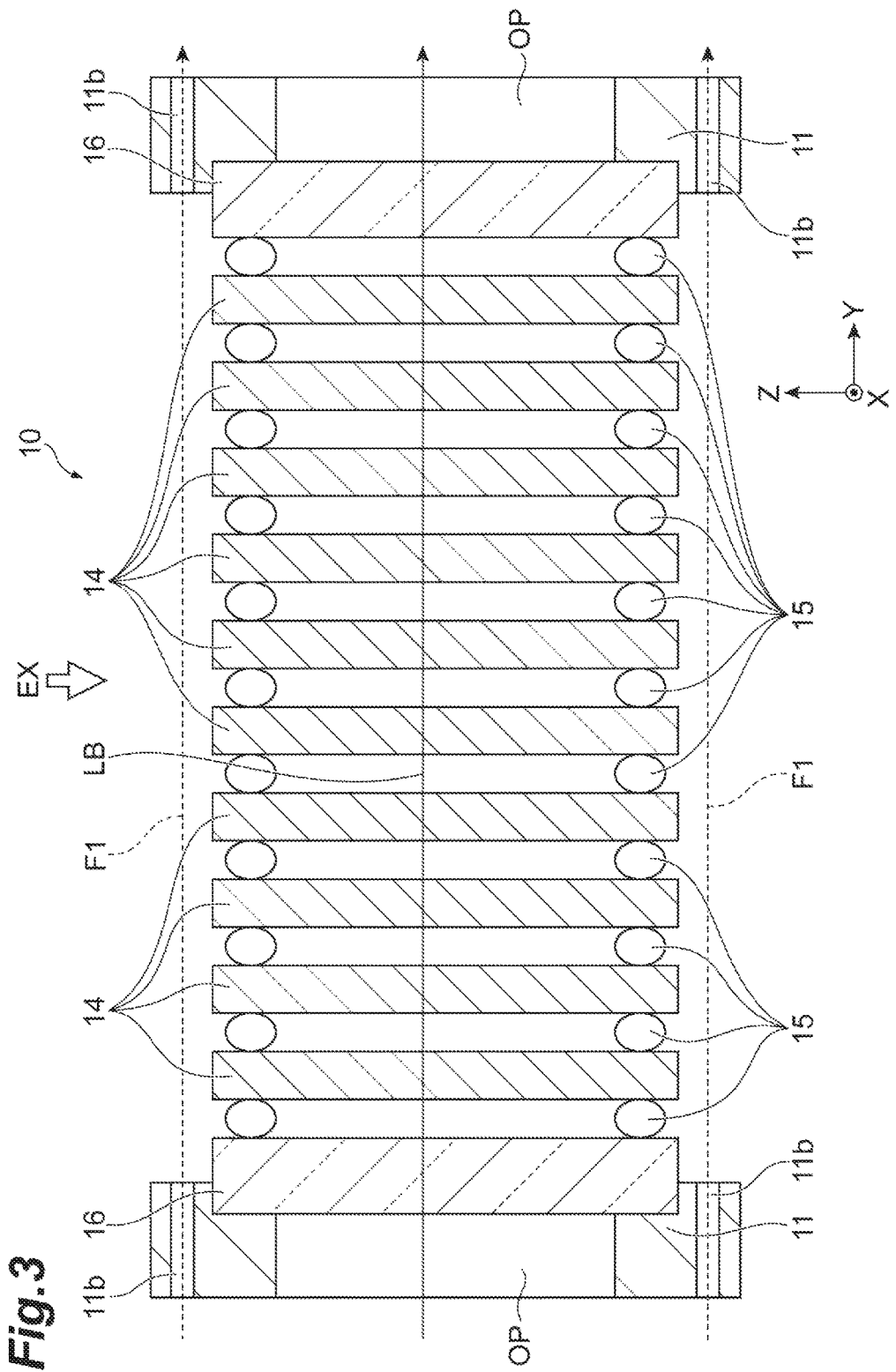
FIG. 3 is a sectional view of the laser medium unit taken along an arrow B-B.

FIG. 2 is a sectional view of the laser medium unit illustrated in FIG. 1 taken along an arrow A-A, and FIG. 3 is a sectional view of the laser medium unit taken along an arrow B-B.

The laser medium unit 10 includes a pair of metallic flanges 11 arranged to be opposite to each other and a plurality of support columns 12 connecting between the flanges 11 and capable of adjusting a distance between the flanges 11. Although four support columns 12 are illustrated in FIG. 1, the position of the main surface (XZ plane) of the flange 11 can be easily fixed if the number of the support columns 12 is equal to or more than three. That is, since the plane is determined by three points, three or more support columns are interposed between the flanges 11 so that the position of the main surface of the flange 11 can be uniquely determined based on the positions of the support columns.

Screw parts are provided at both ends of the support column 12. The flange 11 has an annular shape having an opening OP. An opening (through-hole) through which the screw part of the support column 12 passes is provided in one flange 11, and a screw hole to fix the screw part of the support column 12 is provided in the other flange 11 opposed to the flange 11. The screw part of the support column 12 is screwed with the screw hole of the flange 11. When a nut 13 screwed with the screw part of the support column 12 passing through one flange 11 is included and the nut 13 is rotated, the nut 13 pushes one flange 11 in the Y-axis direction so that a distance between the two flanges 11 is reduced.

A plurality of laser medium plates is laminated and arranged between the two flanges 11. That is, a plurality of disk-shaped and flat plate-like laser media 14 is arranged along the Y-axis direction. A sealing material 15 is interposed between the adjacent laser media 14. Window members 16 formed of quartz glass or the like are arranged at both end positions of the laser medium unit 10 in the Y-axis direction instead of the laser medium 14, and the sealing material 15 is also interposed between the laser medium 14 and the window member 16. The sealing material 15 has an annular shape. When the material of the sealing material 15 can maintain airtightness to prevent the medium from flowing into a space between the laser media 14 from a space other than the through-hole 14a, the material is not especially limited, and a silicone O ring can be applied as the material. Resin, rubber, glass, ceramics, or metal such as Cu and Al can be used as the sealing material 15. The sealing material 15 may be pressed on the surface of the laser medium 14 by alternately laminating the laser medium 14 and the sealing material 15 and applying the pressure to the laminated laser medium 14 and sealing material 15 in the Y-axis direction. The sealing material 15 may be bonded to the laser medium 14 with solder or an adhesive.

Referring to FIGS. 7-(A) and 7-(B), the disk-shaped and flat plate-like laser medium 14 has the through-hole 14a extending along the thickness direction (Y-axis direction). In FIG. 2, a single laser medium 14 has a single through-hole 14a. In the XZ plane, in a case where an angle (position) of the positive direction of the Z-axis is zero degrees, a position (center of gravity position) of the through-hole 14a in a first laser medium 14 (laser medium at the left end in FIG. 2) is placed at the position of zero degree. A position (center of gravity position) of the through-hole 14a in a second laser medium 14 (second laser medium from the left) is placed at a position of 180 degrees, and a position (center of gravity position) of the through-hole 14a of a third laser medium 14 (third laser medium from the left) is placed at the position of zero degree. Referring to the general formula, when an order of the laser medium to which the cooling medium flows is first, an angle of a through-hole in the n-th laser medium in an order of the flow of the cooling medium is n×180 degrees. That is, the positions of the through-holes 14a of the pair of adjacent laser media 14 are symmetrical with respect to the Y axis passing through the center of the laser medium 14 when viewed from the Y-axis direction.

In addition, the disk-shaped flat plate-like window member 16 has a through-hole 16a extending along the thickness direction (Y-axis direction). In FIG. 2, the position of the through-hole 16a in the window member 16 is symmetrical with respect to the Y axis passing through the center of the laser medium 14 adjacent to the window member 16 when viewed from the Y-axis direction.

In this way, from the viewpoint of the stability of the flow speed and the direction of the cooling medium, the positions of the through-holes 14a and 16a are set so that the traveling directions of the cooling media for flowing through the adjacent spaces are opposite to each other. In this case, the distortion of the laser beam due to the flow of the cooling medium can be offset.

Even when the positions of the adjacent through-holes are the same when viewed from the Y-axis direction, a cooling effect can be obtained.

All the materials of the laser medium 14 are, for example, a ceramic laser medium. As the laser medium, a glass laser medium having a low thermal conductivity can be used. However, to output a laser beam with high pulse energy at a high repetition frequency, it is preferable that a thermal conductivity of the laser medium be high from the viewpoint of the cooling performance. It has been known that the ceramic laser medium has properties equivalent to that of a single crystal and has a thermal conductivity higher than that of glass or the like, and the ceramic laser medium can output a laser beam with high pulse energy at a high repetition frequency. By using the glass laser medium, pulse energy higher than that of the ceramic laser medium can be obtained although the repetition frequency is low.

As a ceramic laser medium, for example, YAG containing at least one dopant selected from among rare earth metals, particularly Nd, Yb, Er, Ce, Cr, Cr: Nd, and Tm as a dopant can be used. In addition, as a ceramic laser medium, yttria ($Y_2O_3$) containing the above rare earth metals as the dopant can be used. Further, YAG ($Y_3Al_5O_{12}$), $Lu_2O_3$, and $Sc_2O_3$ can be used.

Regarding such a transparent ceramic crystal, although the upper limit value of the thickness of the laser medium obtained by the current manufacturing method is about 10 mm, it is also possible to use a ceramic laser medium having the thickness equal to or more than 10 mm. In addition, in a case where the ceramic laser medium has a thickness equal to or more than one mm and equal to or less than 20 mm, the structure of the present invention exhibits particularly excellent effects on the rigidity, the cooling performance, and the quality of the laser beam. According to the present device, since the plurality of laser media is used, an amplification factor of the laser beam to be finally output can be increased.

As illustrated in FIGS. 1 to 3, the laser medium 14 is irradiated with the excitation light EX from a plurality of directions along a radial direction perpendicular to the Y axis of the laser medium unit 10. The excitation light EX excites each laser medium 14. A laser beam LB as seed light enters a laser medium group perpendicularly to the main surface (XZ plane) of the laser medium via one window member 16 along the Y axis, and the laser beam LB passes though these laser media 14 and is amplified and output from the other window member 16.

If the adjacent laser media 14 are the flat plate-like first and second laser media, the alignment direction of these laser media 14 coincides with the longitudinal direction (Y axis) of the support column 12, and the pressure to be applied to the sealing material 15 can be adjusted by adjusting the distance between the flanges 11. The sealing material 15 for maintaining the airtightness except for the through-hole is interposed between the first and the second laser media. However, in a case where the pressure applied to the sealing material 15 by the laser medium is appropriate, the airtightness except for the through-hole is sufficiently maintained. Since the length between the flanges 11 can be adjusted, the pressure applied to the sealing material 15 between the laser media can be set to a desired value, and the airtightness except for the through-hole in the space between the laser media can be sufficiently maintained.

That is, the sealing material 15 is arranged between the adjacent laser media 14 (first and second laser media), and the first and the second laser media are aligned and arranged along the thickness direction. The space between the first and the second laser media is an airtight space except for the through-hole, and the cooling medium passes through the space. As a cooling medium, gas (inert gas (air, $N_2$, and $CO_2$), rare gas (Ar and He)), and liquid (heavy water, fluorine-based inert liquid, or the like) can be used. As the fluorine-based inert liquid, Fluorinert (trademark) (fluorine-based inert liquid) manufactured by 3M Japan Ltd. and the like can be used. However, as liquid to be filled, water, refractive index matching liquid, oil, and the like can also be used, in addition to fluorine-based inert liquid.

According to this device, the laser medium 14 is excited by making the excitation light EX enter the laser medium 14. When the laser beam LB enters the laser medium 14 as the seed light, the amplified laser beam LB passes through the laser medium 14 and is output from the window member 16. Since the plurality of laser media 14 is provided, a multiplication factor is increased.

Here, a cooling medium flow path F1 is provided around the laser medium unit 10 and cools the laser medium unit from outside. The space between the first and the second laser media is an airtight space except for the through-holes, and the cooling medium flows between the adjacent through-holes. The flow speed and the direction of the cooling medium can be adjusted according to the size and the direction of the through-hole. Therefore, the laser beam LB for passing through the space is influenced by the cooling medium for flowing on the main surface of the laser medium 14. However, adjustment such as reduction in the size of the through-hole can be performed so as to reduce the influence of the cooling medium. Therefore, a fluctuation of the amplified laser beam LB is suppressed, and the quality such as the stability and the focusing characteristics of the laser beam is improved.

In addition, as illustrated in FIGS. 1 and 3, a hole 11b passing through the flange 11 in the Y-axis direction is provided in the flange 11. A tube which is not shown communicates with the outside of the hole 11b, and a cooling medium in contact with the outer surface of the laser medium unit 10 is supplied or discharged from the hole 11b. The cooling medium introduced from the hole 11b of one of the flanges 11 flows along the Y-axis direction and is discharged from the hole 11b of the other flange 11 as indicated by a dotted arrow F1 illustrated in FIG. 3 while having contact with the surface of the laser medium 14 around the Y axis.

The cooling medium flow path F1 is formed between the laser medium unit 10 and a cylindrical body surrounding the laser medium unit 10. Such a cylindrical body may be provided outside the excitation light source as viewed from the laser medium unit 10 (cylindrical body 24 in FIG. 5), and in addition, the cylindrical body may be provided between the laser medium unit 10 and the excitation light source (transparent cylindrical body 30 in FIG. 5). In a case where the cylindrical body for defining the cooling medium flow path F1 is arranged between the laser medium unit 10 and the excitation light source (the transparent cylindrical body 30 in FIG. 5), the transparent cylindrical body 30 is formed of a transparent material for transmitting the excitation light, for example, quartz glass.

In addition, a tube for supplying the cooling medium is additionally provided to be communicated in the through-hole 16a of the window member 16 on the left side of FIG. 2, and a tube for discharging the cooling medium is additionally provided to be communicated in the through-hole 16a of the window member 16 on the right side. However, description of the tubes is omitted in FIG. 2. In addition, in FIGS. 1 and 4, description of the through-hole 16a is also omitted. Also, the cooling medium can be introduced from a path other than the window member 16. For example, in FIG. 2, it is also possible to provide a through-hole in the sealing material 15 interposed between the window member 16 and the laser medium 14 adjacent to the window member 16. As a result, a part of the cooling medium for flowing through the cooling medium flow path F1 flows into the space between the left window member 16 and the laser medium 14, and the cooling medium is discharged from the space to the cooling medium flow path F1 on the right side.

Figure 4:
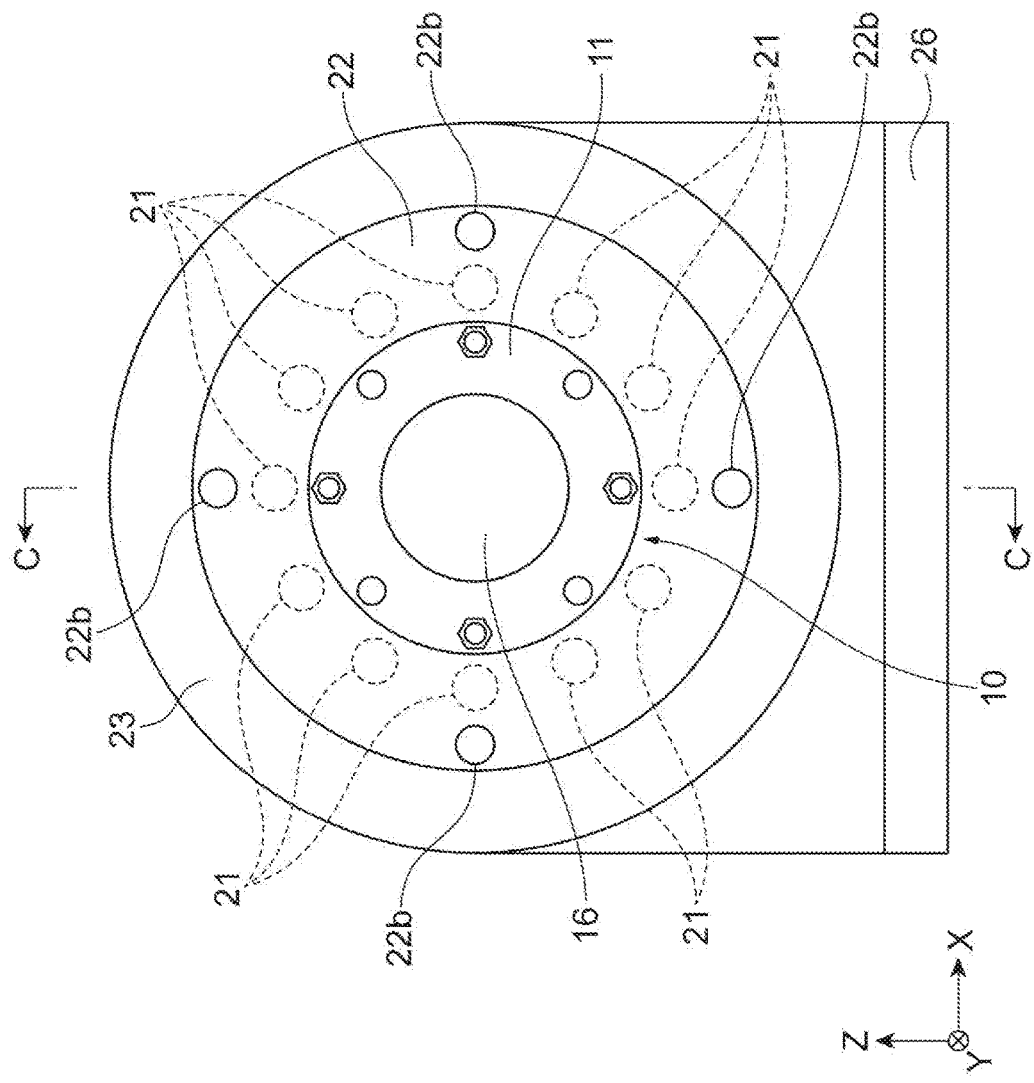
FIG. 4 is a front view of a laser beam amplification device.
Figure 5:
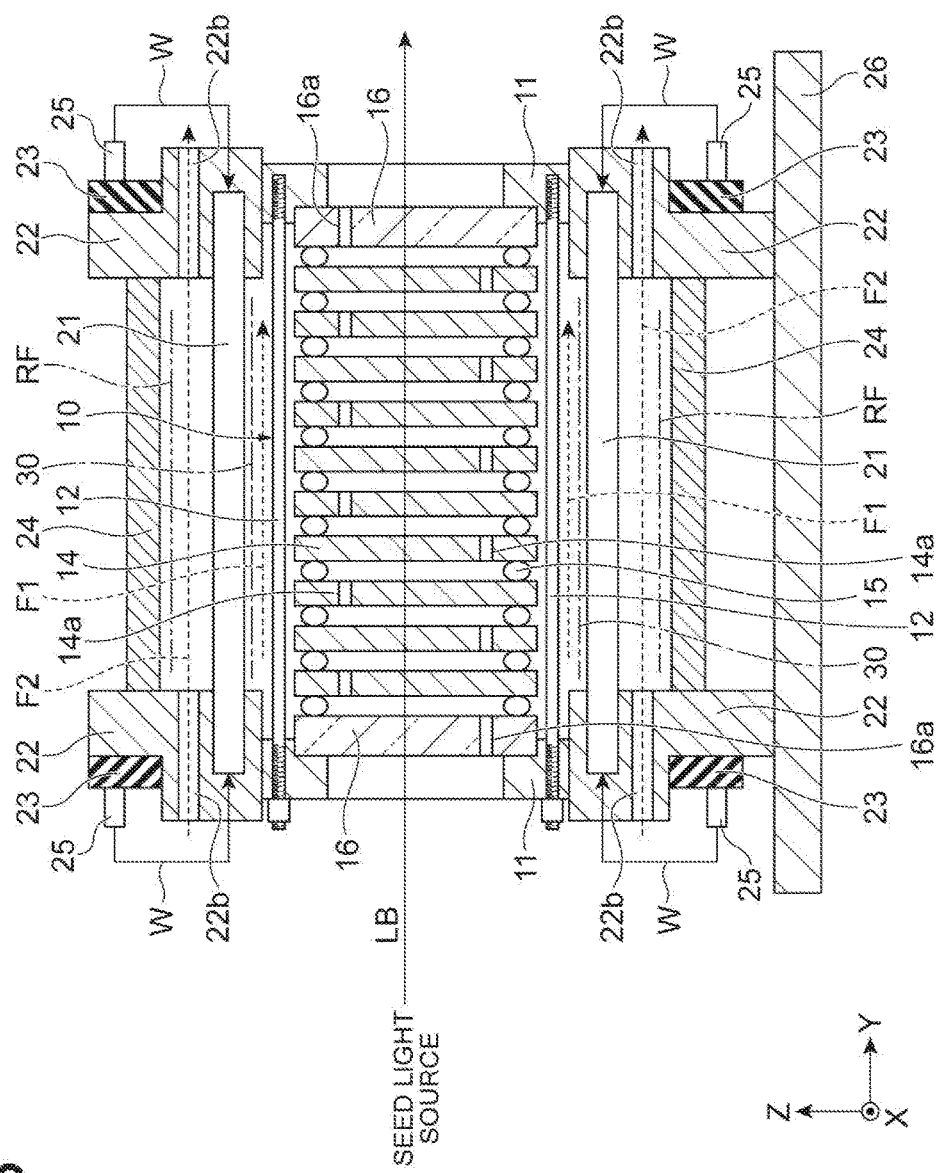
FIG. 5 is a sectional view of the laser beam amplification device taken along an arrow C-C.

FIG. 4 is a front view of the laser beam amplification device, and FIG. 5 is a sectional view of the laser beam amplification device taken along an arrow C-C.

The laser beam amplification device includes the laser medium unit 10, a plurality of excitation light sources 21 for causing the excitation light to enter the laser medium unit 10, and a cooling medium flow path F1 arranged around the laser medium unit 10 (refer to FIG. 5).

The laser beam amplification device amplifies and outputs the laser beam LB input from a seed light source such as a semiconductor laser device into the laser medium unit 10. The transparent cylindrical body 30 is arranged around the laser medium unit 10 as necessary and forms a cooling medium flow path. The excitation light is output from the excitation light source 21. The number of the excitation light sources 21 is 12 in FIG. 4. However, the number of the excitation light sources 21 may be equal to or more than 12 and equal to or less than 12.

The excitation light source 21 is fixed to a pair of substantially annular metallic support members 22 provided outside the laser medium unit 10. An electrode part of the excitation light source 21 and the support member 22 are insulated from each other. The support member 22 has a flange-shaped lip part, and an annular insulator 23 is fixed on the lip part. A plurality of terminals 25 is fixed on the insulator 23, and power is supplied from the terminal 25 to the excitation light source 21 via wiring W. The plurality of excitation light sources 21 may be connected in series and in parallel. The support member 22 has a hole 22b passing through the support member 22 in the Y-axis direction. A tube which is not shown communicates with the hole 22b of one support member 22 so that a cooling medium is introduced into a second cooling medium flow path F2. Also, a tube which is not shown communicates with the hole 22b of the other support member 22 so as to discharge the cooling medium. A reflection material (reflector) RF may be provided between the excitation light source 21 and a housing 24 so that the excitation light from the excitation light source 21 is efficiently transmitted to the laser medium unit.

The inner cylindrical surface of the support member 22 having a circular opening is fixed to the outer peripheral surface of the flange 11 of the laser medium unit 10. The pair of support members 22 is connected by a cylindrical body 24, and the second cooling medium flow path F2 is formed between the inner surface of the cylindrical body 24 and the excitation light source 21. The bottom surface of the support member 22 having the circular opening is fixed on a support base 26.

The structure of the sealing material 15 illustrated in FIG. 2 is not limited to the above-described structure.

Figure 6:
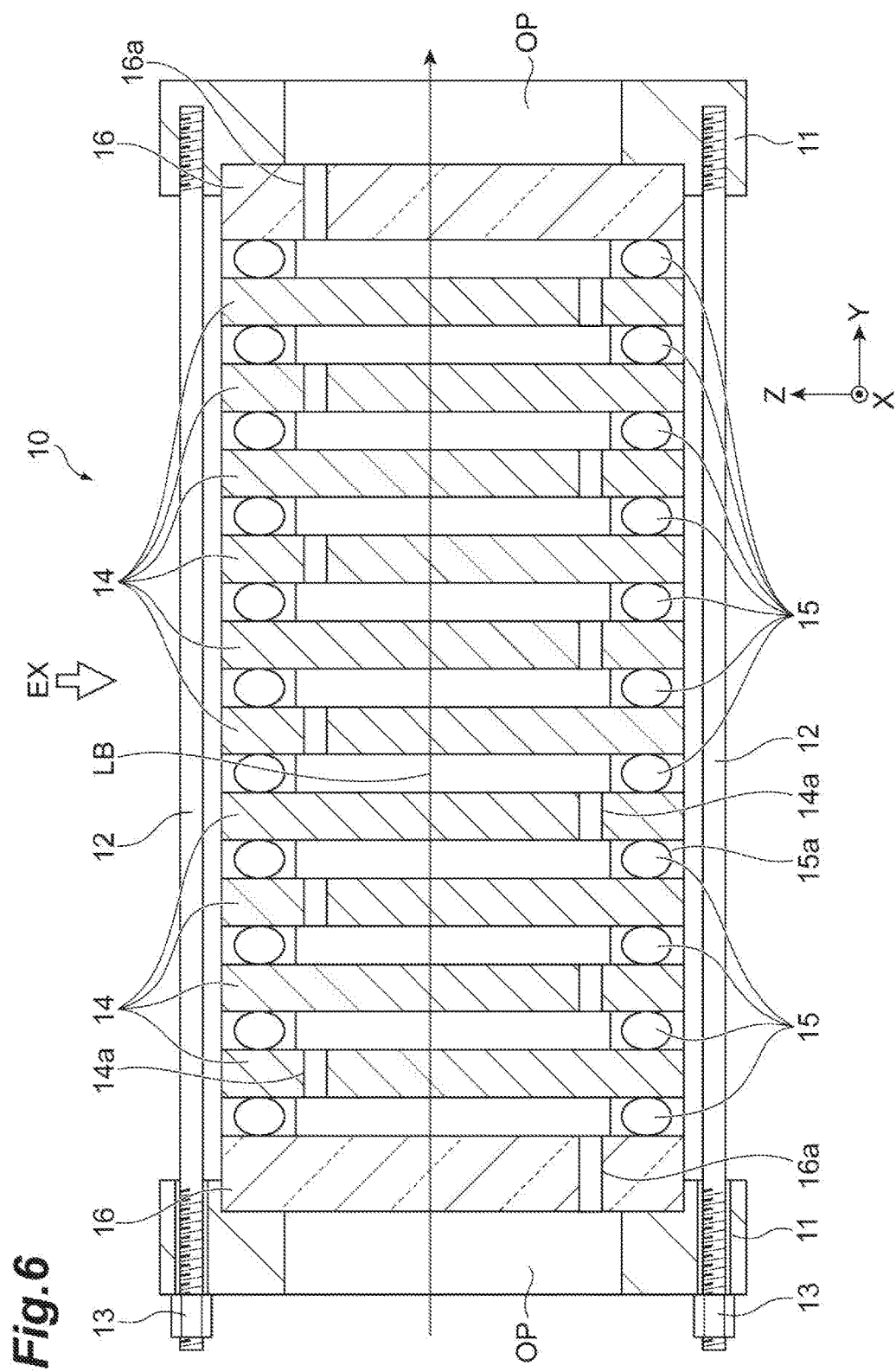
FIG. 6 is a sectional view of the laser medium unit taken along the arrow A-A in a case where auxiliary elements are provided near sealing materials (O ring).

FIG. 6 is a sectional view of the laser medium unit taken along the arrow A-A in a case where auxiliary elements are provided near sealing materials (O ring). At both ends of the sealing material 15 in the radial direction, auxiliary elements 15a are arranged to assist sealing by the sealing material 15. As the auxiliary element 15a, in addition to an adhesive material such as a resin, a spacer having higher rigidity than silicone O ring can be used. As a spacer, two annular spacers concentrically arranged around the Y axis can be employed, and an O ring as the sealing material 15 can be arranged between the annular spacers. As a spacer material, a glass material and ceramics can be used in addition to metals such as Cu and Al.

A prototype of the laser medium unit is made.

In this device, each laser medium formed of Nd; YAG has a diameter of 100 mm, a thickness of 10 mm, and the number of the laser media is 10. Heavy water flows in a space between the laser media. A laser beam having a wavelength of 1064 nm is used as seed light, and 12 flash lamps are used as the excitation light sources. In this case, the laminated ceramic laser media function as a large-sized laser rod. Since the laser media are integrated, the laminated media can function as a large-sized laser rod. However, since the flow speed of the cooling medium can be controlled by the through-hole, deterioration in the characteristics of the laser beam can be prevented. The diameter of the support column 12 is two mm. In addition, the overall size is about 30 cm, and the size is extremely small. However, a laser output equal to or more than 50 joules can be obtained.

An antireflection film for the seed light may be provided on a light incident surface of the main surface (XZ surface) of the window member. As a result of providing the antireflection film, the seed light can easily enter the window member of the preceding stage and can be easily emitted from the window member of the subsequent stage. Antireflection processing other than the antireflection film may be performed to the main surfaces. Similarly, an antireflection film for the seed light may be provided on a light incident surface of the laser medium. Antireflection processing other than the antireflection film may be performed to the main surfaces. The antireflection film or the antireflection processing may be provided not only on the light incident surface of each light transmitting element but also on a light emitting surface. As an antireflection film, for example, a dielectric multilayer film can be used. As a dielectric multilayer film, a laminate of titanium oxide and silicon oxide has been known. Refractive index matching liquid having a refractive index equal to that of the laser medium also can be used. In a case where rare gas flows in the space between the laser media, deterioration in the laser medium due to the rare gas is prevented.

To prevent parasitic oscillation caused by spontaneous emission light, the laser medium may be surrounded by a cladding material. As a cladding material which absorbs spontaneous emission light (1064 nm), a samarium added material, a chromium added material, and a copper added material are exemplified. Specifically, samarium added YAG, samarium added glass, chromium added YAG, chromium added glass, copper added YAG, copper added glass, and the like are used. To fix the cladding materials to the laser medium, they are bonded or joined to each other. In a case where the cladding material is bonded to the laser medium, an adhesive is interposed therebetween. In a case where an adhesive is used, an adhesive such as a resin refractive index matching adhesive and a glass refractive index matching adhesive can be used. In a case where an adhesive is not used, joint such as thermal diffusion bonding, optical contact, and ion sputtering bonding can be used. In a case where the outer surface of the laser medium part and the cladding material are made of ceramics, the ceramic sintering bonding can be used to fix them. Also, the material of and the bonding method for the antireflection film relative to the excitation light (808 nm) are similar to those relative to the seed light or the spontaneous emission light.

In addition, the main surface of the laser medium may be inclined from a plane perpendicular to the Y axis so that the main surfaces of the laser media adjacent and opposed to each other are not arranged in parallel. With this arrangement, the parasitic oscillation caused by unnecessary reflection by the main surface can be reduced. That is, if each laser medium has a plate-like shape, it is not necessary for the laser medium to be a parallel flat plate, and the surface may be slightly inclined. As the cooling medium described above, liquid or gas can be used. As the liquid, water can be used. As the gas, helium gas or the like can be used. However, if the cooling medium has a cooling performance, the cooling medium is not limited to these. In addition, the type of the cooling medium for flowing through the cooling medium flow path F1 can be different from that of the cooling medium for flowing in the space between the laser media. In the most appropriate combination, water is used as the cooling medium for flowing through the cooling medium flow path F1 and helium is used as the cooling medium for flowing in the space between the laser media. With this combination, the influence of the distortion of the laser beam caused by the cooling medium can be more suitably prevented.

The shape of the through-hole in the laser medium can be variously modified.

FIGS. 8-(A) and 8-(B) are respectively a front view of the laser medium (FIG. 8-(A)) and a sectional view taken along the arrow D-D (FIG. 8-(B)).

In the laser medium 14, the number of the through-holes 14*a* is two. The two through-holes 14*a* exist at positions of zero degree and 180 degrees in the XZ plane while assuming that the Z-axis direction is zero degree. By having two or more through-holes, the flowing direction and the flow speed of the cooling medium can be more accurately adjusted.

FIGS. 9-(A) and 9-(B) are respectively a front view of the laser medium (FIG. 9-(A)) and a sectional view taken along the arrow D-D (FIG. 9-(B)).

In this laser medium 14, the number of the through-holes 14*a* is three. The three through-holes 14*a* exist at positions of zero degree, 120 degrees, and 240 degrees ($\theta1=\theta2=\theta3=120$ degrees in FIG. 9-(A)) in the XZ plane while assuming that the Z-axis direction is zero degree. By having two or more through-holes, a flowing direction and the flow speed of the cooling medium can be more accurately adjusted. In addition, in a case where three through-holes are arranged at a uniform angular position, an effect can be obtained that a larger amount of the cooling medium can be flowed at a lower speed than a case of the two through-holes.

FIGS. 10-(A) and 10-(B) are respectively a front view of the laser medium (FIG. 10-(A)) and a sectional view taken along the arrow D-D (FIG. 10-(B)).

In the laser medium 14, the shape of an opening of the through-hole 14*a* is an arc along the outer circumference of the laser medium 14. The opening angle $\theta4$ of the circular arc can be set to 10 degrees to 180 degrees. In this case, from the viewpoint of the stability of the flow speed and the direction of the cooling medium, there is an effect that a large amount of the cooling medium can be stably flowed at a low speed in one direction.

FIGS. 11-(A) and 11-(B) are respectively a front view of the laser medium (FIG. 11-(A)) and a sectional view taken along the arrow D-D (FIG. 11-(B)).

In the laser medium 14, the through-hole 14*a* extends in a direction oblique to the thickness direction (Y axis) of the laser medium 14. The angle formed by the center axis of the through-hole 14*a* and the Y axis can be set to 10 degrees to 80 degrees. The above angle can be set to equal to or more than 30 degrees and equal to or less than 80 degrees to prevent an eddy flow caused by fluid collision with the adjacent laser medium. In this case, from the viewpoint of the stability of the flow speed and the direction of the cooling medium, there is an effect that the direction, in which it is desired to flow the cooling medium, has directivity so that the cooling medium can stably flow.

FIGS. 12-(A) and 12-(B) are respectively a front view of the laser medium (FIG. 12-(A)) and a sectional view taken along the arrow D-D (FIG. 12-(B)).

In the laser medium 14, the through-hole 14a has a tapered shape. In a case where the through-hole 14a has a tapered shape relative to the traveling direction of the cooling medium, from the viewpoint of the stability of the flow speed and the direction of the cooling medium, there is an effect that a cooling performance can be improved by positively generating turbulent flow.

FIGS. 13-(A) and 13-(B) are respectively a front view of the laser medium (FIG. 13-(A)) and a sectional view taken along the arrow D-D (FIG. 13-(B)).

In the laser medium 14, the through-holes 14a are annularly arranged along the outer circumference of the laser medium 14. Although 24 through-holes 14a are illustrated in FIG. 13-(A), the number of the through-holes 14a is not limited to 24 and may be larger or smaller than 24. In this case, from the viewpoint of the stability of the flow speed and the direction of the cooling medium, there is an effect that a large amount of the cooling medium can be stably flowed at a low speed in a uniform direction.

As described above, in the laser medium unit including the laser medium 14 according to the embodiment, the plurality of laser media 14 is laminated along the thickness direction of the laser media, and the sealing material is interposed between the adjacent laser media.

Since the sealing material is interposed between the laser media, the cooling medium flows through the through-hole of the laser medium. By laminating the laser media 14, the laser media can function as a large-sized laser rod. However, since the flow speed of the cooling medium can be controlled by the through-holes, the deterioration in the characteristics of the laser beam can be prevented.

In addition, regarding the laser medium unit, in a case where the XYZ three-dimensional orthogonal coordinate system is set and the stacking direction of the laser media 14 is assumed to be the Y axis, there are adjacent laser media respectively having the through-holes 14a of which positions in the XZ plane are different from each other (refer to FIG. 2).

Since the positions of the through-holes 14a, that is, the positions of an introduction port of the cooling medium to the space between the adjacent laser media 14 and an output port are different from each other, the flow path of the cooling medium for flowing between the introduction port and the output port can be controlled.

The laser beam amplification device (refer to FIG. 5) using the laser medium unit 10 includes the laser medium unit 10, the excitation light source 21 for causing the excitation light to enter the laser medium unit 10, a unit (through-hole 16a of window member 16 and the like) for supplying the cooling medium in the through-hole 14a of the laser medium 14, and the cooling medium flow path F1 arranged around the laser medium unit 10.

According to this device, the laser medium 14 is excited by making the excitation light enter the laser medium 14. When the laser beam enters the laser medium 14 as the seed light, the amplified laser beam is output from the laser medium 14. In addition, in a case where the plurality of laser media 14 is provided, the multiplication factor also increases.

Here, to minimize the distortion of the laser beam caused by the cooling medium, it is preferable that the flow speed of the cooling medium output from the through-hole 14a and for flowing through the space between the cooling media be small. However, the cooling performance is lowered. Therefore, by providing the cooling medium flow path F1 around the laser medium unit 10, the laser medium is sufficiently cooled and the characteristics of the laser medium is stabilized while preventing the deterioration in the cooling performance only by the through-hole 14a. Accordingly, the deterioration in the quality of the laser beam such as stability and focusing characteristics can be more prevented, and the laser beam with high quality can be output.

Note that the position of the laser medium can be rotated around the Y axis. For example, the laser medium can be arranged as rotating, for example, by 180 degrees, 90 degrees, or 30 degrees. In a case where the positive direction of the Z axis is defined as vertically upward, the heated cooling medium receives a force in the Z-axis positive direction. To prevent the accumulation of the heated cooling media on the upper part in the positive direction of the Z axis, it is preferable that the rotation angle be set so that the position of the through-hole 14a include zero degree while assuming that the positive direction of the Z axis is zero degree.

REFERENCE SIGNS LIST 14 laser medium
12 support column
15 sealing material
11 flange

The invention claimed is:

1. A laser medium unit including laser media, each of the laser media is a plate-like laser medium comprising a through-hole for making a cooling medium pass through the through-hole, wherein excitation light enters the laser medium from an outer peripheral surface of the laser medium, wherein
    a thickness of the plate-like laser medium is from 1 mm to 20 mm, inclusive,
    the laser media are stacked in the thickness direction thereof,
    a ring-shaped sealing material is interposed between adjacent laser media; and
    the sealing material receives pressure in the stacking direction of the laser media.

2. The laser medium unit according to claim 1, wherein in a case where an XYZ three-dimensional orthogonal coordinate system is set and the stacking direction of the laser media is defined as the Y axis,
    there are adjacent laser media respectively having through-holes of which positions in an XZ plane are different from each other.

3. A laser beam amplification device comprising:
    the laser medium unit according to claim 1;
    an excitation light source configured to cause excitation light to enter the laser medium unit;
    a unit configured to supply a cooling medium in a through-hole of a plate-like laser medium of the laser media; and
    a cooling medium flow path configured to be arranged around the laser medium unit;
    wherein the plate-like laser medium comprises Yb-added YAG, and the added concentration of Yb in the laser medium is set from 0.1 atomic % to 10 atomic %, inclusive.

* * * * *